United States Patent [19]

Ptacek et al.

[11] Patent Number: 5,027,724
[45] Date of Patent: Jul. 2, 1991

[54] SUBSOIL FERTILIZER APPLICATOR HAVING ARCUATELY ADJUSTABLE KNIFE

[75] Inventors: Timothy J. Ptacek; Randall S. Jones; Eric Johnson, all of Salina, Kans.

[73] Assignee: Great Plains Manufacturing, Incorporated, Assaria, Kans.

[21] Appl. No.: 503,747

[22] Filed: Apr. 3, 1990

[51] Int. Cl.$^5$ ............................................. A01C 23/02
[52] U.S. Cl. ..................................... 111/121; 111/123; 172/737; 172/166
[58] Field of Search ............... 111/118, 121, 123, 140, 111/154–157, 167, 926; 172/166, 180, 737

[56] References Cited

U.S. PATENT DOCUMENTS

| 59,638 | 11/1866 | Patton . | |
|---|---|---|---|
| 465,220 | 12/1891 | Steinke . | |
| 562,755 | 6/1896 | Banwarth . | |
| 2,001,003 | 5/1935 | Tuft . | |
| 2,375,372 | 5/1944 | Laitinen . | |
| 2,489,385 | 11/1949 | Paul . | |
| 2,968,266 | 1/1958 | Gustafson . | |
| 3,188,989 | 6/1965 | Johnston . | |
| 3,237,577 | 12/1963 | Wilkins . | |
| 3,292,562 | 12/1966 | Clark | 111/123 |
| 3,319,589 | 5/1967 | Moran | 111/121 |
| 3,799,079 | 3/1974 | Dietrich . | |
| 4,466,364 | 8/1984 | Hassenfritz . | |
| 4,538,532 | 9/1985 | Coker . | |
| 4,628,840 | 12/1986 | Jacobson | 111/121 |
| 4,656,957 | 4/1987 | Williamson et al. | 172/166 X |
| 4,671,193 | 6/1987 | States . | |
| 4,947,770 | 8/1990 | Johnston | 111/121 |

FOREIGN PATENT DOCUMENTS

| 590486 | 1/1960 | Canada . | |
|---|---|---|---|
| 1430726 | 7/1967 | France . | |
| 157853 | 10/1963 | U.S.S.R. . | |
| 446118 | 10/1974 | U.S.S.R. . | |
| 0882447 | 11/1981 | U.S.S.R. | 111/140 |
| 1098018 | 1/1968 | United Kingdom . | |

Primary Examiner—Dennis L. Taylor
Assistant Examiner—Jeffrey L. Thompson
Attorney, Agent, or Firm—Hovey, Williams, Timmons & Collins

[57] ABSTRACT

A fertilizer applicator employs a rotating, trash-cutting coulter and a knife located immediately behind the coulter with the leading arcuate edge of the knife and the rearward arcuate periphery of the coulter in intimately spaced relation to one another. As the coulter wears, the knife may be adjusted upwardly and forwardly along a slightly arcuate path of travel while simultaneously rocked slightly forwardly so as to maximize the length of the front knife edge that is close to the coulter while maintaining a substantially constant depth relationship between the knife and the coulter.

18 Claims, 4 Drawing Sheets

SUBSOIL FERTILIZER APPLICATOR HAVING ARCUATELY ADJUSTABLE KNIFE

BACKGROUND OF THE INVENTION

1. Field of the Invention

This invention relates to a coulter and knife assembly advantageously designed for the knife to be accurately and precisely adjusted to maintain a critical, close-coupled trailing relationship with the coulter.

2. Description of the Prior Art

The use of applicator assemblies incorporating coulters and knives for attachment to agricultural implements is well known. The coulter is used to slice through surface trash and grass, as well as the soil itself, and the knife follows closely behind, usually carrying a conduit for liquid or dry fertilizer or the like.

One basic problem with such assemblies is that as the coulter blade is diametrically worn down by normal use the front edge of the knife becomes more distantly spaced from the rear peripheral edge of the coulter, thus increasing the size of the gap between the coulter and the knife and making it easier for stemmy crop residue and other tough materials to enter and accumulate within the gap. This trash buildup inhibits proper action of the applicator as it moves through the soil.

Furthermore, as the coulter wears down, the depth of the knife relative to the coulter typically changes since the knife is normally constructed in such a way that it wears more slowly than the coulter. Unless the knife can be adjustably raised as the coulter wears, the knife may eventually project down below the coulter and snag debris pressed into the slice by the coulter.

A number of devices concerning coulter blades with adjustable knives have been proposed in the past. In general, however, these units have not been totally satisfactory.

SUMMARY OF THE INVENTION

Accordingly, one important object of the present invention is to provide a knife adjustment arrangement in which repositioning of the knife to reestablish an intimate, close-coupled relationship with the rear of the coulter following reduction in the diameter of the coulter due to wear also reestablishes the optimum depth relationship between the bottom of the knife and the coulter.

As a corollary to the foregoing, an additional important object of the present invention is to provide a way of adjusting the knife that maximizes the length of the coulter periphery which remains in intimately spaced relationship with the leading edge of the knife after adjustments for coulter wear while maintaining a substantially constant depth relationship between the bottom of the knife and the lowermost periphery of the coulter.

In carrying out the foregoing objects, the present invention contemplates the use of mounting structure for the knife which normally holds the knife in a fixed position for field operation but which can be easily released temporarily to permit adjusting movement in a generally upward and forward direction relative to the coulter so as to reestablish the desired relationship between those components following peripheral wear of the coulter. Preferably, the knife is limited to movement along a slightly arcuate path of travel and is caused to rock forward slightly as it moves, both motions having a common axis of curvature located below and forwardly of the axis of rotation of the coulter. This combined arcuate bodily displacement and rocking motion has the net effect of not only keeping the leading edge of the knife close to the coulter along the lower stretch of the knife, but also of keeping the bottom extremity of the knife at a fairly constant depth relative to the bottom extremity of the coulter.

In its preferred form, the structure for accomplishing the compound adjusting action of the knife includes an arcuate slot in the knife that receives a releasable bolt on the support member of the applicator. A specially located abutment on the support has an arcuate surface that bears against a correspondingly arcuate surface on the knife, both of which share a common axis with the axis of the arcuate slot so that the abutment and the slot effectively cooperate to guide and limit the knife in its adjusting movement and motions.

DESCRIPTION OF THE PREFERRED EMBODIMENT

Figure 1:
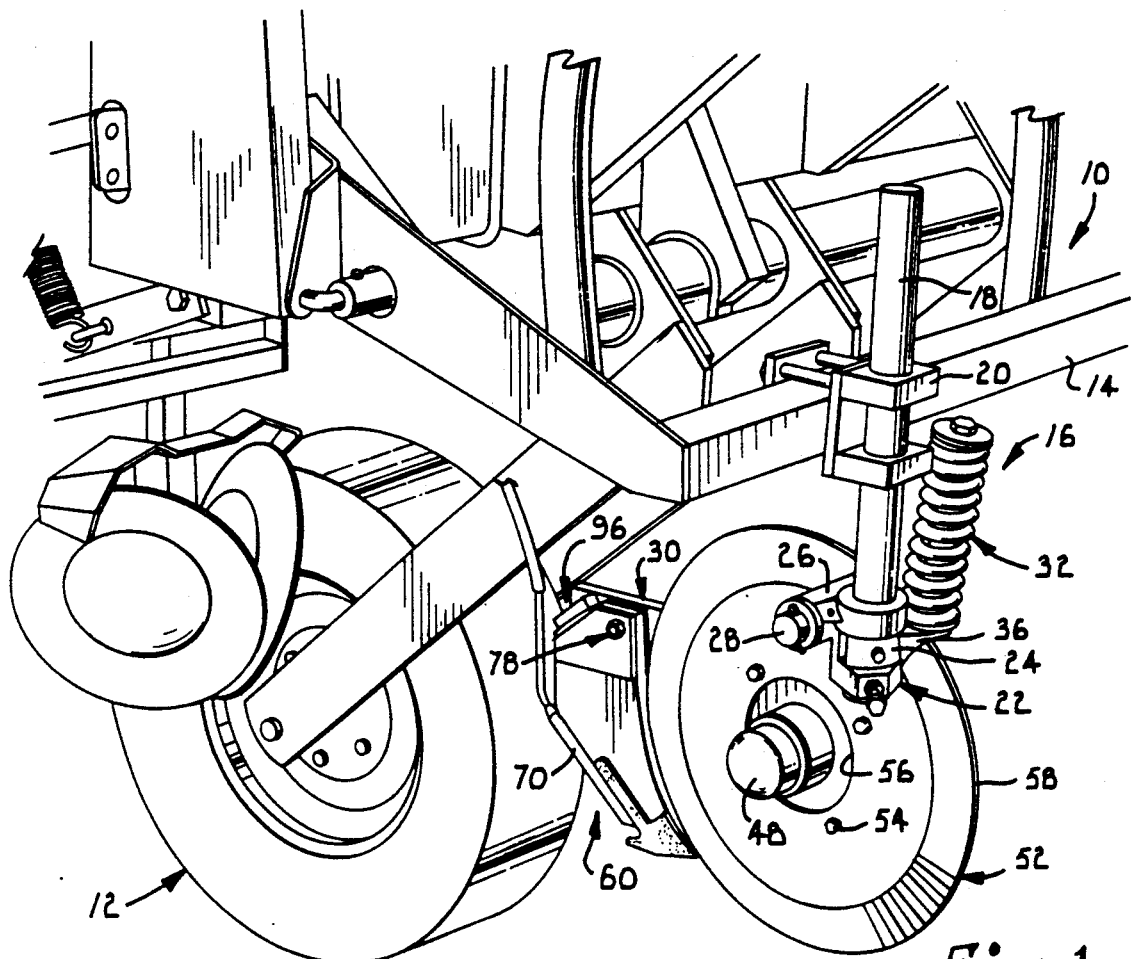
FIG. 1 is a right, front perspective view of an applicator assembly in accordance with the present invention mounted on an agricultural implement.

FIG. 1 shows an implement such as a planter having a frame 10 carried by ground wheels 12 (only one being illustrated) for movement over the ground. The frame 10 includes a front transverse beam 14 upon which is mounted an applicator 16 in accordance with the present invention. A number of such applicators 16 would normally be carried by the frame 10 at spaced locations along the beam 14.

Figure 4:
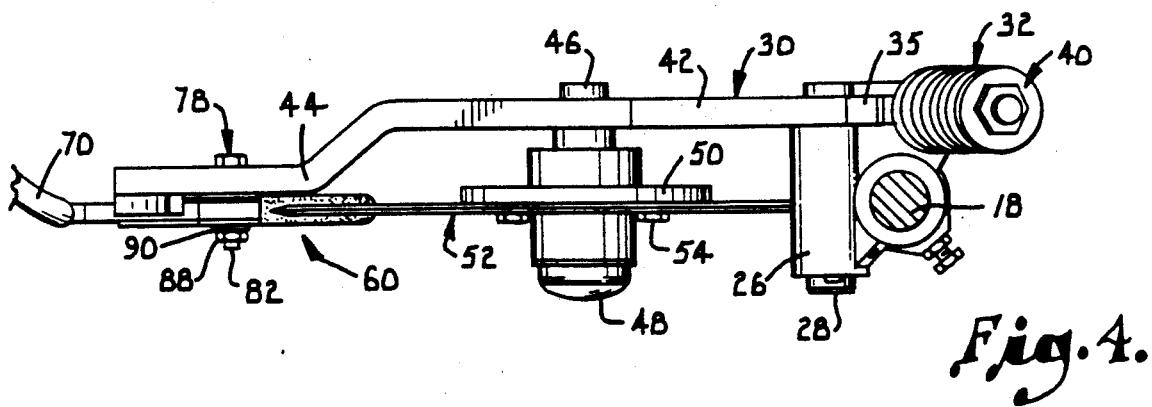
FIG. 4 is a fragmentary, horizontal cross-sectional view of the applicator taken substantially along line 4—4 of FIG. 3.
Figure 5:
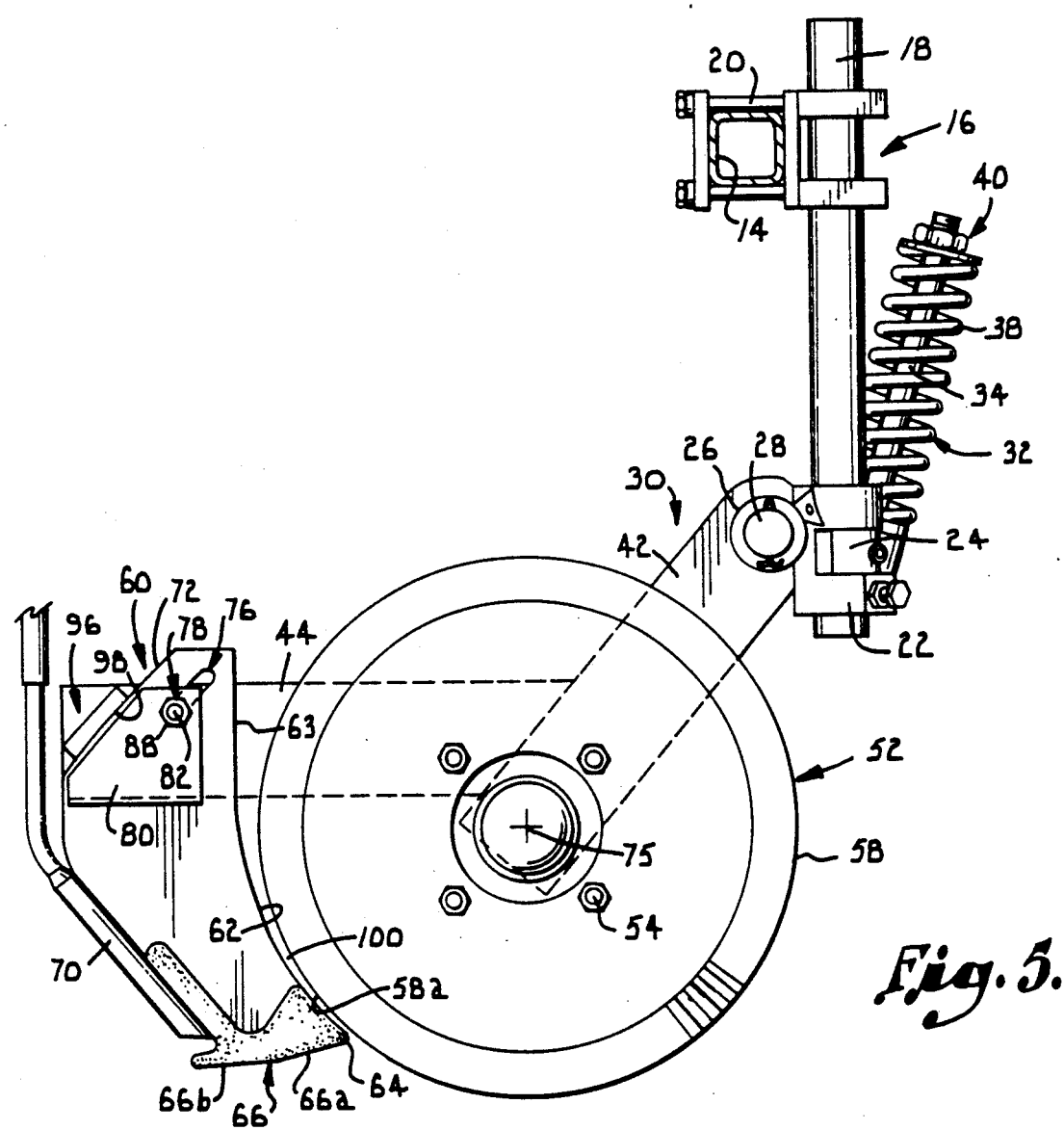
FIG. 5 is an enlarged, fragmentary, right side elevational view of the applicator similar to FIG. 3 but depicting the readjusted orientation of the knife and reduced diameter coulter after the coulter has experienced considerable wear, the gap again being exaggerated for clarity.
Figure 6:
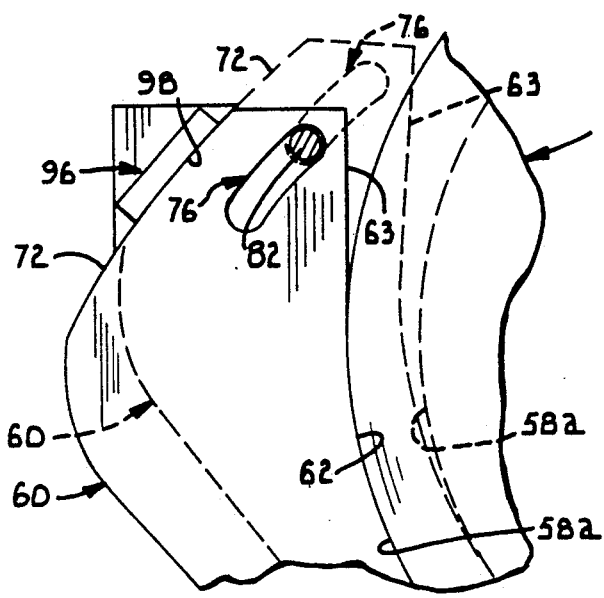
FIG. 6 is an enlarged, fragmentary, detailed view of the knife mounting and adjusting structure illustrating the starting position of the knife in solid lines and the fully adjusted position in phantom lines.

The applicator 16 has a main upright post 18 that is attached to the beam 14 by a clamp assembly 20. At the lower end of the post 18 a cast part which functions as a swivel bracket 22 can rotate slightly about the post 18 between opposite limits defined by a stop 24. The bracket 22 also has a horizontally extending, rearwardly disposed transverse hub 26 that rotatably receives a transverse stub shaft 28 which is, in turn, fixed to the upper end of a generally downwardly and rearwardly extending support arm 30 (FIGS. 3, 4, and 5) so that the arm 30 is rendered swingable in an up and down direction.

The arm 30 is yieldably biased downwardly by a spring assembly 32 that includes a generally upwardly and diagonally forwardly extending rod 34 connected at its lower end via a short crank 35 (FIG. 4 only) to the arm 30 so that the rod 34 moves up and down in opposite relationship to movement of the arm 30. That is to say, as the arm 30 moves upwardly in a clockwise direction, viewing FIG. 3, for example, the rod 34 moves downwardly because of the latter's location forwardly of the stub shaft 28. The rod 34 passes through an outwardly projecting lip 36 (FIG. 1) integral with the swivel bracket 22 and reciprocates relative thereto during up and down movement, while a coil spring 38 which encircles the rod 34 is trapped between the lip 36 on the one hand and an adjustable nut and washer assembly 40 on the upper end of the rod 34 on the other hand so as to be compressed during upward swinging of the support arm 30.

The support arm 30 includes a forwardly disposed and inclined leg 42 and a rearwardly disposed generally horizontal leg 44 rigidly affixed to leg 42. As illustrated perhaps best in FIG. 2, at the lower end of the leg 42 is provided a laterally outwardly projecting stub spindle 46. The spindle 46 in turn carries a bearing assembly 48 illustrated in FIGS. 1 and 3-5, which includes a circular backing plate 50 shown in top plan view in FIG. 4. The plate 50 provides a mounting means for a coulter 52 which is attached to the plate 50 via machine screws 54, the coulter 52 having a centrally disposed opening 56 that clears the bearing assembly 48. The coulter 52 is relatively thin and flat so as to produce a circular, peripheral edge 58 that readily cuts through soil and trash during operational use.

Figure 3:
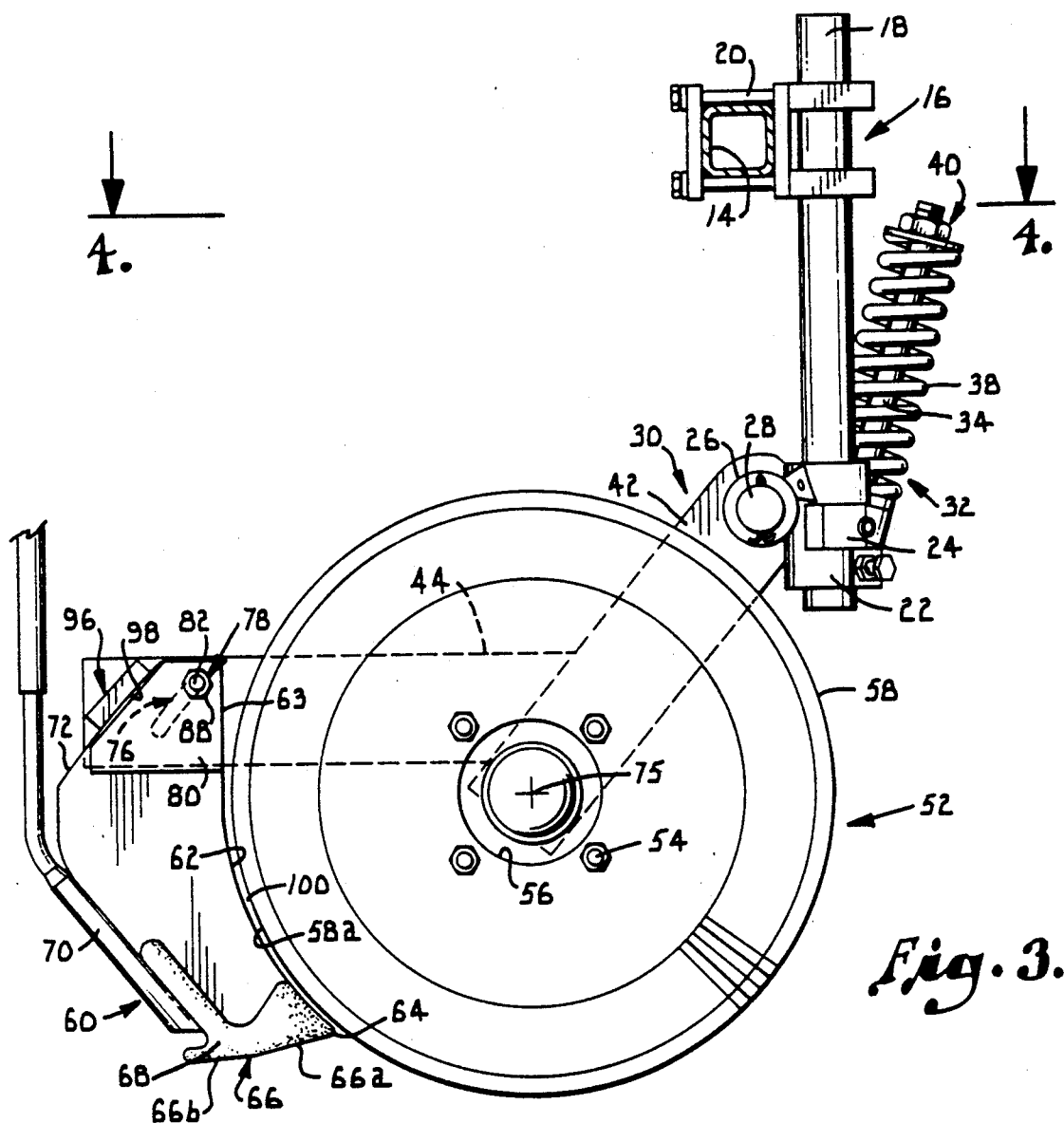
FIG. 3 is an enlarged, right side elevational view of the applicator of FIG. 1 showing a new, full-size coulter prior to wear and the knife in its lowermost position prior to wear adjustment, the gap between the knife and the coulter being exaggerated for illustrative purposes.

The rear end of the horizontal leg 44 of support arm 30 carries an upright applicator knife, broadly denoted by the numeral 60, in close-coupled, intimate trailing relation to the coulter 52. The knife 60 is of flat, plate-like construction having an arcuate leading edge 62 that generally conforms to the peripheral edge 58 of the coulter 52 when the latter is new, as illustrated in FIG. 3. The knife 60 also has a straight, upper, front edge 63 that is vertically disposed and tangentially merges with the arcuate edge 62. The lower front end of the knife 60 terminates in a pointed tip 64, and the bottom extremity 66 of the knife 60 has an upwardly and forwardly inclined portion 66a immediately behind the tip 64 and a generally horizontally extending portion 66b immediately behind the portion 66a. A layer of hard-facing 68 may be applied to opposite sides of the knife 60 in the lower regions of the latter in the pattern illustrated in FIG. 3, for example, to prolong wear of the knife 60.

The lower back edge of the knife 60 is angled upwardly and rearwardly, providing a convenient location for attachment of a discharge tube 70 for agricultural substances such as fertilizer in either liquid or granular form. The tube 70 leads upwardly to a source of supply (not shown) of the substance on the frame 10 so that the farmer may simultaneously put down fertilizer and plant seeds with the same piece of equipment.

The upper rear edge 72 of the knife 60 is angled upwardly and forwardly and is slightly arcuate in nature, having an axis of curvature 74 (FIG. 7) located far below and substantially forwardly of the axis of rotation 75 of the coulter 52 defined by the stub spindle 46. An upwardly and forwardly extending slot 76 in the upper region of the knife 60 forwardly of the upper rear edge 72 is also of arcuate configuration, having an axis of curvature coinciding with the axis of curvature 74, for the rear edge 72.

Figure 2:
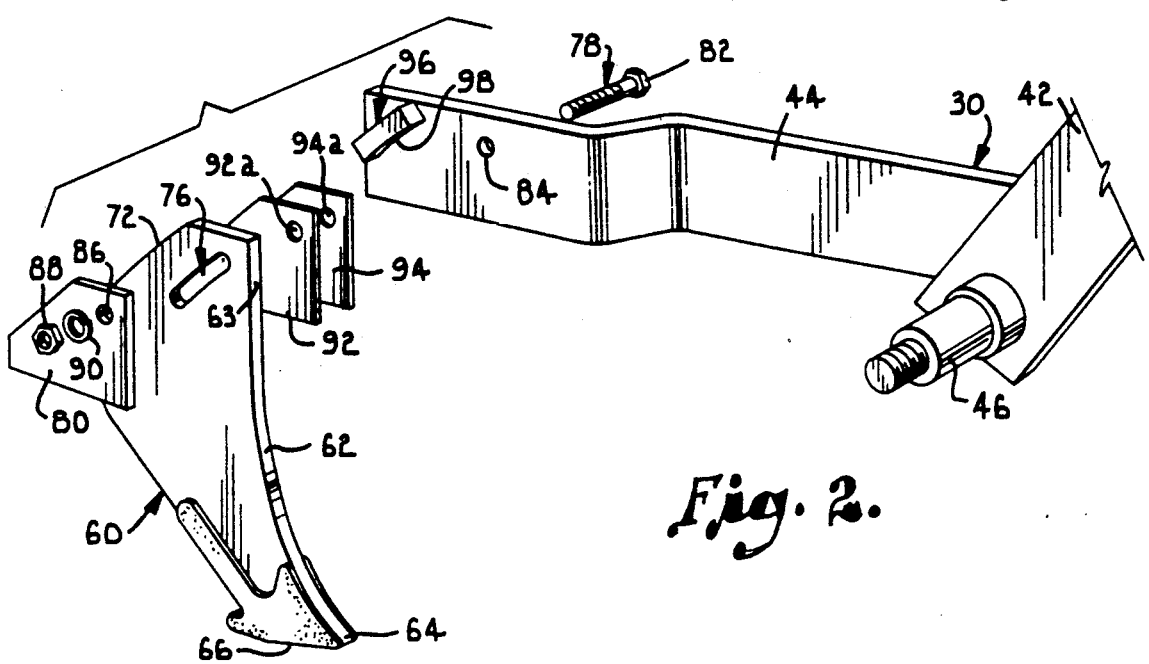
FIG. 2 is a fragmentary exploded view of the knife and portions of the mounting support in accordance with the present invention.

As illustrated in detail in FIG. 2 the knife 60 is adustably secured to the leg 44 of support arm 30 by a nut and bolt assembly 78, together with a clamping plate 80. The bolt 82 of assembly 78 projects through a hole 84 in the leg 44, the slot 76 in knife 60, and a hole 86 in the clamping plate 80 located on the outside face of the knife 60. A nut 88 of the assembly 78 is threaded onto the outer end of the bolt 82 and is provided with an underlying lock washer 90 to help maintain the knife 60 tightly clamped against the support leg 44 during use. One or more shim plates 92 and 94 having respective bolt holes 92a and 94a may be inserted between the knife 60 and the support leg 44 if necessary in order to precisely align the knife 60 laterally with the forwardly disposed coulter 52, depending upon manufacturing tolerances and other considerations.

The leg 44 of support arm 30 is also provided with an abutment bar 96 disposed to the rear of the bolt hole 84 and inclined generally upwardly and forwardly. The abutment bar 96 is provided with an arcuate front guide surface 98 that is disposed to bear against the upper rear edge 72 of the knife 60, the guide surface 98 having the same axis of curvature 74 as the rear knife edge 72 and the slot 76. As will be seen from the operational discussion which follows, the abutment bar 96 serves both as a thrust-receiving means for loads experienced by the knife 60 as the latter moves through the soil, and as a means for guiding the knife 60 during its adjusting movement to compensate for wear of the coulter 52. It will thus be seen that the bolt assembly 78, the slot 76, the upper rear edge 72 of the knife 60, and the abutment bar 96 collectively may be referred to as adjustment means for the knife 60.

Operation

In use, the applicator 16 of the present invention may be duplicated in a number of identical applicators spaced along the beam 14 to the extent and in the position desired by the farmer. By virtue of the close proximity of the knife 60 to the coulter 52, only a small amount of fore-and-aft space is required to accommodate each applicator 16, permitting the applicator 16 to be readily attached as an "add-on" accessory to an existing planter not previously provided with fertilizer application apparatus.

Preferably, when the applicator 16 is first readied for use with a full-size, new coulter 52, the knife 60 is disposed with its leading edge 62 in intimately spaced relation to the lower rear portion 58a of the peripheral edge 58 of coulter 52, as illustrated in FIG. 3. Although the arcuate gap 100 between periphery portion 58a and leading edge 62 in FIG. 3 has been exaggerated for purposes of illustration, it will be appreciated that such gap is ideally only wide enough to prevent significant frictional engagement between the knife edge 62 and coulter 52. In practice, it is preferred that the tip 64 of the knife 60 be spaced from the rear peripheral portion 58a of coulter 52 no more than 1/32 of an inch, and preferably closer than that, such that the gap 100 is less than 1/32 of an inch for a significant distance above the tip 64. It is also desirable that the lower extremity 66 of the knife 60 be spaced a distance above the lowermost extent of the coulter 52 so that the knife 60 does not project downwardly below the coulter 52 during movement through the soil, which action could otherwise cause snagging of trash materials and promote wedging of such materials within the gap 100.

As illustrated in FIG. 3, the knife 60 is preferably located at the lower limit of its adjustable travel when the coulter 52 is new. With the bolt and nut assembly 78 tightly secured, the knife 60 is clamped firmly against the support leg 44 and is prevented from swinging upwardly and rearwardly in a clockwise direction during movement through the abutment bar 96 which receives the rearwardly and upwardly directed loads imparted to the knife 60 by the soil. As the implement advances, the coulter 52 cuts through surface trash such as stalks, stubble, and other debris, and opens a thin slice which is immediately entered by the trailing knife 60. As the knife 60 holds the slice open, the discharge tube 70 at the rear thereof deposits the fertilizer or other materials to complete the application process.

Figure 7:
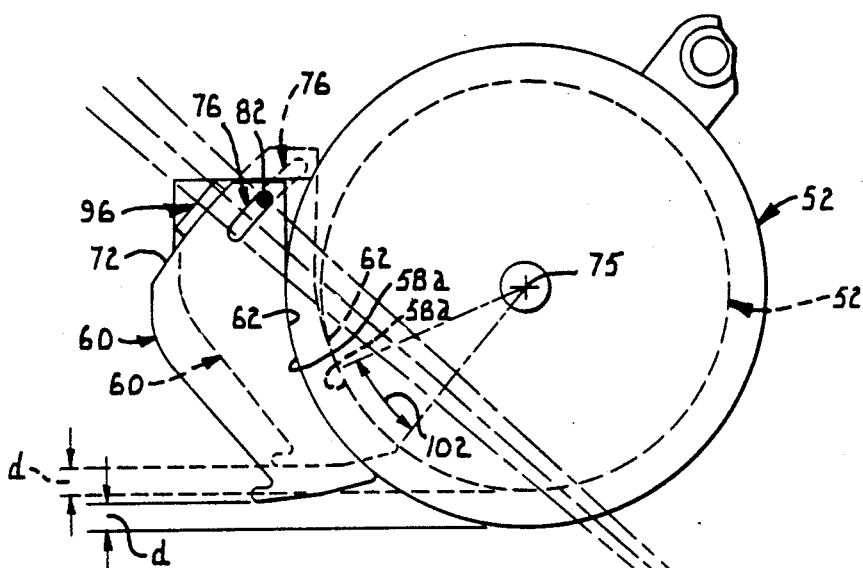
FIG. 7 is a schematic, right side elevational view of the applicator illustrating the significance of the combined arcuate development and rocking motion of the knife during its adjustment to compensate for diametrical wear of the coulter.

As the applicator 16 encounters extended use, the coulter 52 experiences significant wear, reducing its diameter substantially. In order to minimize the width of the gap 100, it thus becomes necessary from time to time to temporarily release the bolt assembly 78 and adjust the knife 60 closer to the coulter 52. Generally speaking, such adjusting movement of the knife 60 is diagonally upward and forward so that the depth of the knife 60 relative to the coulter 52 is also adjusted at the same time the fore-and-aft relationship of those components is attended to. The abutment bar 96 and the slot 76 cooperate to limit the knife 60 during such adjustment to an upward and forward path of movement, and, more particularly, to movement along an arcuate path of travel having its center of curvature at axis 74 as illustrated in FIG. 7. Such arcuate movement of the knife 60, coupled with a slight forward rocking motion at this time as a consequence of the interacting curved surfaces of the adjusting means, has the beneficial effect of maintaining the depth relationship between the knife 60 and the coulter 52 generally constant while maximizing the length of the front knife edge 62 that is intimately close to the rear peripheral portion 58a of the coulter 52.

FIG. 7 illustrates the beneficial result which is obtained by moving the knife 60 upwardly along an arcuate path of travel and rocking it forwardly during adjustment to compensate for coulter wear. With the knife 60 in its lowermost position and the bolt 82 at the upper end of the slot 76, the full-size coulter 52 has most, if not all, of its lower rear peripheral portion 58a in very close proximity to the arcuate leading edge 62 of the knife 60. However, as the coulter 52 becomes worn, its radius of curvature becomes less than that of the knife edge 62 so that more and more of the coulter periphery tends to depart from the leading edge 62 as the wear progresses. Rocking the knife 60 slightly forwardly while it is also moved upwardly and forwardly, maximizes the close proximity of the leading knife edge 62 extending upwardly from the tip 64 with the coulter periphery 58a while the depth relationship between the bottom of the knife 60 and the worn coulter remains generally constant.

Note in FIG. 7 that even when the knife 60 is adjusted to its full raised position with the bolt 82 at the bottom end of the slot 76, there is still a larger angular portion of the coulter periphery that is very close to the knife edge 62. That angle has been denoted by reference numeral 102 on FIG. 7 and may be referred to as the "arc of contact" between the knife 60 and the coulter 52. Such arc of contact may be measured in degrees and for the illustrated embodiment, is defined as the arc at full adjustment within which no point on the coulter is more than 1/32 inch away from the leading edge 62 of the knife 60. The distance "d" representing the depth relationship between the bottom of the knife 60 and the lowermost extremity of the coulter 52 is substantially the same at full adjustment and no adjustment positions.

In one preferred form of the invention, the coulter 52 when new has an 18 inch diameter. The overall height of the front of the knife is 10 and 13/32 inches with a length of 3 and ⅜ inches for the upper front edge 63. The leading edge 62 has a radius of 8 and 9/16 inches while the radius of the upper rear edge 72 is 38 and ⅝ inches. The radius of the rear surface of the slot 76 is 37 and 41/64 inches, while the radius of the lower front edge of the slot 76 is 37 and 7/64 inches. The radius of the curved front surface 98 of the abutment bar 96 is 38 and ⅜ inches.

In such an exemplary embodiment, the distance "d" between the bottom of the knife 60 and the lowermost extremity of the coulter 52 is initially 0.91 inches. With the knife 60 in its fully adjusted position and the coulter worn down from a diameter of 18 inches to a diameter of 14.5 inches, the arc of contact 102 is 27.35°. The new distance "d" in the fully adjusted position is 0.90 inches, showing a very slight net lowering of the knife 60 relative to the coulter 52. Such minimal amount of relative downward movement of the knife 60 relative to the coulter 52, however, is not enough to place the knife 60 in jeopardy of improper operation.

Figure 8:
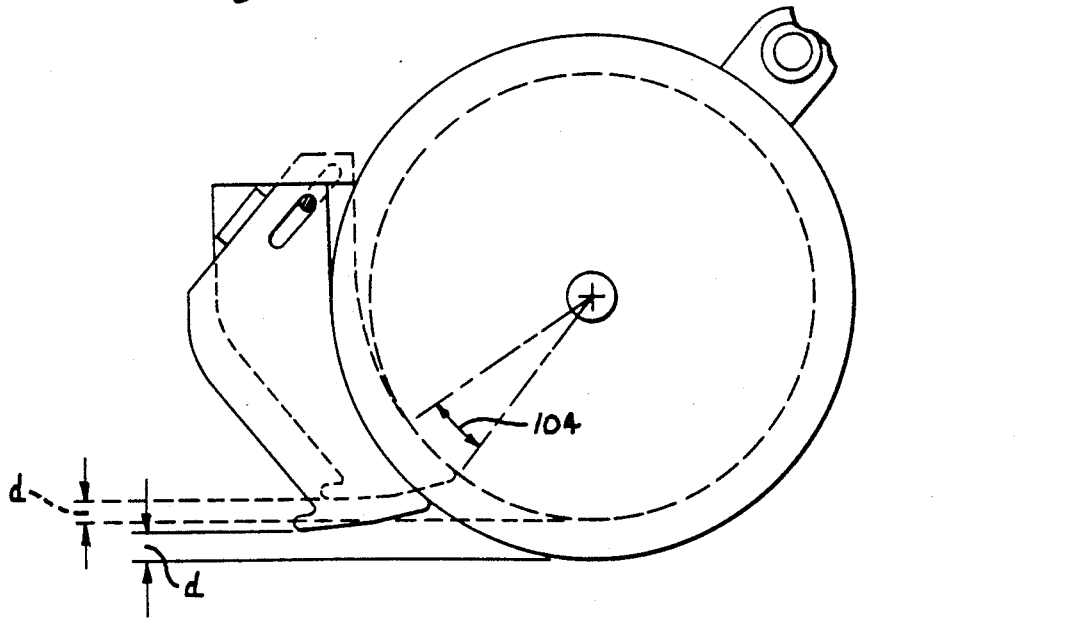
FIG. 8 is a schematic, right side elevational view of a hypothetical applicator illustrating results which would be obtained if the knife were merely adjusted upwardly and forwardly along a straight line in an effort to compensate for coulter wear.

On the other hand, in FIG. 8 a hypothetical situation is illustrated in which a similarly configured knife, but without an arcuate guide slot or an arcuate guide bar, is simply adjusted in a straight diagonal line upwardly and forwardly to compensate for coulter wear. Again assuming a coulter diameter of 18 inches when new, and a diameter of 14.5 inches when worn, the resulting arc of contact 104 at the fully worn condition is only 18.0°, compared to 27.35° in the arcuate embodiment of FIG. 7.

Similarly, in the straight line embodiment of FIG. 8, the distance "d" drops from 0.97 initially to only 0.69 at full adjustment, representing a substantial net downward movement of the knife relative to the bottom extremity of the coulter.

Consequently, it should be apparent that the compound adjusting action for the knife in accordance with the present invention in which the knife moves up about an arcuate path of travel while also rotating slightly forwardly results in maintenance of an intimate relationship between the knife edge 62 and the coulter 52 over a greater distance than would otherwise be the case. Additionally, the depth relationship between the knife and the coulter can be maintained substantially constant at all adjusted positions of the knife. Consequently, improved ability to avoid plugging of the gap 100 between the coulter 52 and the knife 60 can be expected.

It will be appreciated that the foregoing description sets forth only a preferred and exemplary embodiment of the invention. However, variations on the foregoing could be made without departing from the principles thereof. For example, although the bolt 82 is illustrated as being on the support arm 30 while the slot 76 is on the knife 60, the opposite arrangement could be provided without sacrificing the principles of the present invention. Moreover, it will be appreciated that various modifications of the foregoing could be made by those skilled in the art without departing from the spirit of the invention. Accordingly, the present invention should be limited only by the fair scope of the claims which follow.

We claim:

1. In a subsoil applicator for agricultural substances, the improvement comprising:

a support adapted to be mounted on a mobile frame;

a coulter rotatably mounted on said support for rotation about an axis transverse to the normal direction of travel of the frame, said coulter having an outer circular periphery;

an upright knife carried by the support in trailing relation to the coulter and having means for discharging a substance into the soil as the knife passes therethrough, said knife having a leading arcuate edge conforming generally to the lower rear portion of the coulter periphery and spaced closely behind said portion, said knife further having a forwardmost tip at the lower end of said leading edge and a bottom extremity spaced a distance about the lowermost portion of the coulter periphery; and means for adjustably attaching the knife to said support in a manner to promote maintaining the closely spaced relationship between the lower rear peripheral portion of the coulter and the arcuate edge of the knife without substantial change in the distance between the lower extremity of the knife and the lowermost peripheral portion of the coulter, notwithstanding progressive reduction in the diameter of the coulter through wear, said adjusting means including structure limiting the knife during adjustment to a compound action that includes rotational forward rocking and arcuate displacement upwardly and forwardly along an arcuate path of travel, said leading arcuate edge of the knife being adjusted generally upwardly and inwardly toward said axis of rotation of the coulter.

2. A subsoil applicator as claimed in claim 1, said structure including bolt and slot means between the support and the knife.

3. A subsoil applicator as claimed in claim 1, said structure providing an arcuate path of travel for the knife including a bolt on one of the support and the knife and an arcuate slot on the other of the support and the knife, such structure providing rotational forward rocking of the knife including a pair of interengaging, arcuate guide surfaces on the support and the knife.

4. A subsoil applicator as claimed in claim 1, said structure including a bolt one of the support and the knife and arcuate slot on the other of the support and the knife, said structure further including thrust-receiving means between the support and the knife and spaced from said bolt in a location to counteract loading applied to the knife by the soil during use tending to rotate the knife upwardly and rearwardly about the bolt.

5. A subsoil applicator as claimed in claim 1, said rocking motion of the knife and the arcuate path of travel thereof having a common axis of curvature located below and forwardly of the axis of rotation of the coulter.

6. A subsoil applicator as claimed in claim 5, said structure providing an arcuate path of travel for the knife including a bolt on one of the support and the knife and an arcuate slot on the other of the support and the knife, such structure providing rotational forward rocking of the knife including a pair of inter-engaging, arcuate guide surfaces on the support and the knife.

7. A subsoil applicator as claimed in claim 6, said support having an abutment spaced rearwardly from the adjustment bolt for the knife, said abutment having a generally upwardly and forwardly inclined, arcuate front surface comprising said arcuate guide surface on the support, said knife having an upwardly and rearwardly disposed arcuate edge slidably engageable with said arcuate front surface of the abutment and comprising said arcuate guide surface on the knife.

8. In a subsoil applicator for agricultural substances, the improvement comprising:

a support adapted to be mounted on a mobile frame;

a coulter rotatably mounted on said support for rotation about an axis transverse to the normal direction of travel of the frame, said coulter having an outer circular periphery;

an upright knife carried by the support in trialing relation to the coulter and having means for discharging a substance into the soil as the knife passes therethrough, said knife having a leading arcuate edge conforming generally to the lower rear portion of the coulter periphery and spaced closely behind said portion, said knife further having a forwardmost tip at the lower end of said leading edge and a bottom extremity spaced a distance above the lowermost portion of the coulter periphery; and means for adjustably attaching the knife to said support in a manner to promote maintaining the closely spaced relationship between the lower rear peripheral portion of the coulter and the arcuate edge of the knife without substantial change in the distance between the lower extremity of the knife and the lowermost peripheral portion of the coulter, notwithstanding progressive reduction in the diameter of the coulter through wear, said adjusting means including structure limiting the knife during adjustment to a compound action that includes rotational forward rocking and arcuate displacement upwardly and forwardly along an arcuate path of travel, said rocking motion of the knife and the arcuate path of travel thereof having a common axis of curvature located below and forwardly of the axis of rotation of the coulter.

9. In a subsoil applicator for agricultural substances, the improvement comprising:

a support adapted to be mounted on a mobile frame;

a coulter rotatably mounted on said support for rotation about an axis transverse to the normal direction of travel of the frame, said coulter having an outer circular periphery;

an upright knife carried by the support in trailing relation to the coulter and having means for discharging a substance into the soil as the knife passes therethrough, said knife having a leading arcuate edge conforming generally to the lower rear portion of the coulter periphery and spaced closely behind said portion, said knife further having a forwardmost tip at the lower end of said leading edge and a bottom extremity spaced a distance above the lowermost portion of the coulter periphery; and means for adjustably attaching the knife to said support in a manner to promote maintaining the closely spaced relationship between the lower rear peripheral portion of the coulter and the arcuate edge of the knife without substantial change in the distance between the lower extremity of the knife and the lowermost peripheral portion of the coulter, notwithstanding progressive reduction in the diameter of the coulter through wear, said adjusting means including structure limiting the knife during adjustment to a compound action that includes rotational forward rocking and arcuate displacement upwardly and forwardly along an arcuate path of travel, said structure providing an arcuate path of travel for the knife including a bolt on one of the support and the knife and an arcuate slot on the other of the support and the knife, such structure providing rotational forward rocking of the knife including a pair of inter-engaging, arcuate guide surfaces on the support and the knife, said support having an abutment spaced rearwardly from the adjustment bolt for the knife, said abutment having a generally upwardly and forwardly inclined, arcuate front surface comprising said arcuate guide surface on the support, said knife having an upwardly and rearwardly disposed arcuate edge slidably engageable with said arcuate front surface of the abutment and comprising said arcuate guide surface on the knife.

10. A subsoil applicator as claimed in claim 9, said arcuate guide surface on the abutment, said upper rear guiding edge of the knife and said arcuate slot having a common axis of curvature located downwardly and forwardly of the axis of rotation of the coulter.

11. In a subsoil applicator for agricultural substances, the improvement comprising:

a support adapted to be mounted on a mobile frame;

a coulter rotatably mounted on said support for rotation about an axis transverse to the normal direction of travel of the frame, said coulter having an outer circular periphery;

an upright knife carried by the support of trialing relation to the coulter and having means for discharging a substance into the soil as the knife passes therethrough, said knife having a leading arcuate edge conforming generally to the lower rear portion of the coulter periphery and spaced closely behind said portion, said knife further having a forwardmost tip at the lower end of said leading edge and a bottom extremity spaced a distance above the lowermost portion of the coulter periphery; and means for adjustably attaching the knife to said support in a manner to promote maintaining the closely spaced relationship between the lower rear peripheral portion of the coulter and the arcuate edge of the knife without substantial change in the distance between the lower extremity of the knife and the lowermost peripheral portion of the coulter, notwithstanding progressive reduction in the diameter of the coulter through wear, said adjusting means including structure limiting the knife during adjustment to a compound action that includes rotational forward rocking and arcuate displacement upwardly and forwardly along an arcuate path of travel, said structure including a bolt on one of the support and the knife and an arcuate slot on the other of the support and the knife, said structure further including thrust-receiving means between the support and the knife and spaced from said bolt in a location to counteract loading applied to the knife by the soil during use tending to rotate the knife upwardly and rearwardly about the bolt, said thrust-receiving means including a rigid abutment on the support spaced rearwardly from said bolt, said knife being disposed to remain in contacting engagement with the abutment throughout movement of the knife between various adjusted positions thereof.

12. A subsoil applicator as claimed in claim 11, said abutment and said knife having mutually engageable, matingly arcuate, elongated surfaces having axes coincident with the axis of the slot and with the axis of the path of travel of the knife during adjustment.

13. A subsoil applicator as claimed in claim 12, said slot being on the knife and said bolt being on the support.

14. In a subsoil applicator as claimed in claim 13, said bolt comprising a part of a nut and bolt assembly for releasably clamping the knife to the support in a selected position of adjustment.

15. In a subsoil applicator for agricultural substances, the improvement comprising:

a support adapted to be mounted on a mobile frame;

a coulter rotatably mounted on said support for rotation about an axis transverse to the normal direction of travel of the frame, said coulter having an outer circular periphery;

an upright knife carried by the support in trialing relation to the coulter and having means for discharging a substance into the soil as the knife passes therethrough, said knife having a leading arcuate edge conforming generally to the lower rear portion of the coulter periphery and spaced closely behind said portion, said knife further having a forwardmost tip at the lower end of said leading edge and a bottom extremity spaced a distance above the lowermost portion of the coulter periphery; and means for adjustably attaching the knife to said support, said adjusting means including structure limiting the knife during adjustment to a compound action that includes rotational forward rocking and arcuate displacement upwardly and forwardly along an arcuate path of travel, said leading arcuate edge of the knife being adjusted generally upwardly and inwardly toward said axis of rotation of the coulter.

16. A subsoil applicator as claimed in claim 15, said rocking motion of the knife and the arcuate path of travel thereof having a common axis of curvature located below and forwardly of the axis of rotation of the coulter.

17. A subsoil applicator as claimed in claim 16, said structure providing an arcuate path of travel for the knife including a bolt on one of the support and the knife and an arcuate slot on the other of the support and the knife, such structure providing rotational forward rocking of the knife including a pair of inter-engaging, arcuate guide surfaces on the support and the knife.

18. A subsoil applicator as claimed in claim 17, said support having an abutment spaced rearwardly from the adjustment bolt for the knife, said abutment having a generally upwardly and forwardly inclined, arcuate front surface comprising and arcuate guide surface on the support, said knife having an upwardly and rearwardly disposed arcuate edge slidably engageable with said arcuate front surface of the abutment and comprising said arcuate guide surface on the knife.

* * * * *